Dec. 13, 1932.                L. L. WAGNER                 1,891,126
                           SIGNALING APPARATUS
                           Filed June 14, 1932
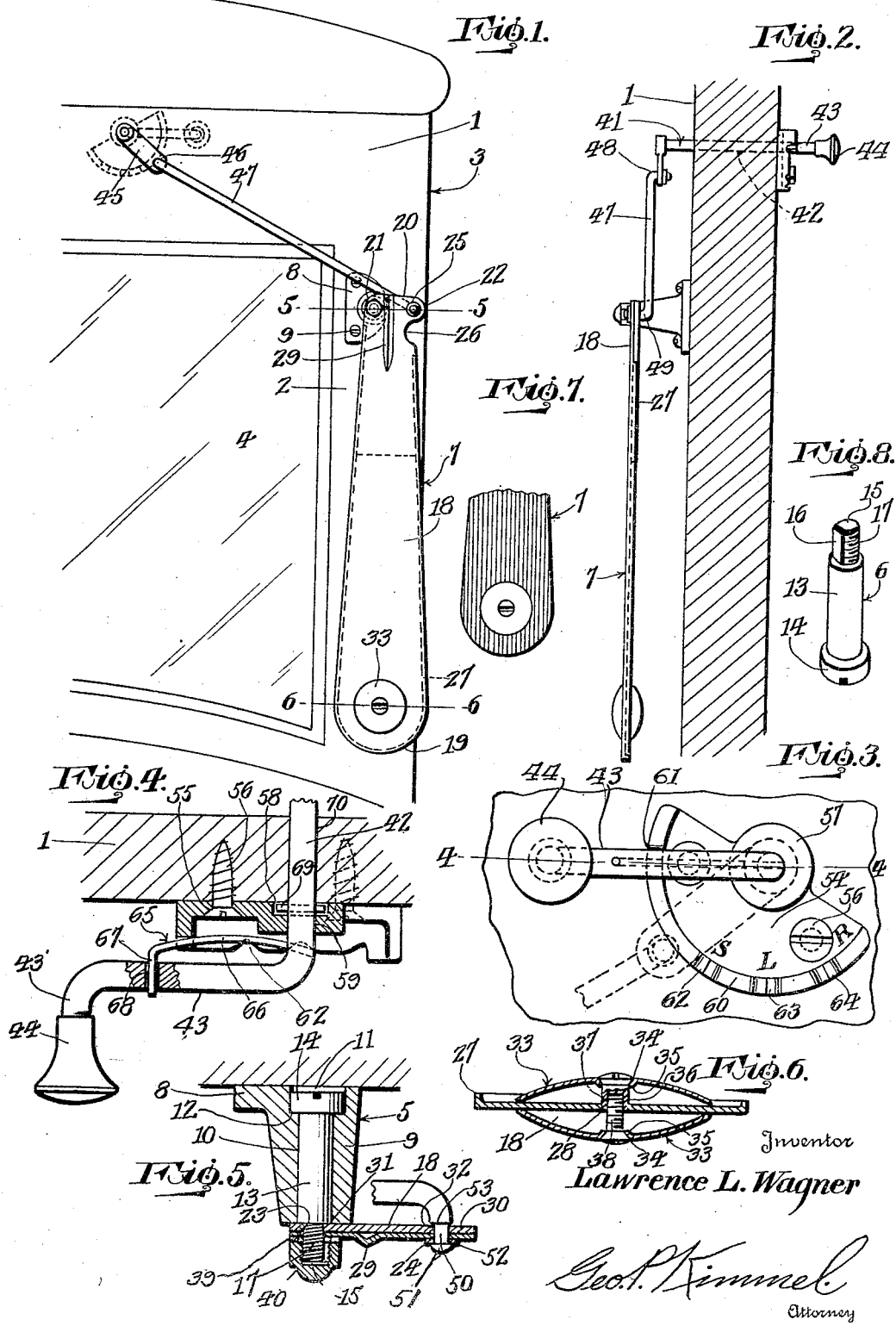
Inventor
Lawrence L. Wagner
Geo. P. Kimmel
Attorney Patented Dec. 13, 1932

1,891,126

UNITED STATES PATENT OFFICE

LAWRENCE L. WAGNER, OF SHIRLEYSBURG, PENNSYLVANIA

SIGNALING APPARATUS

Application filed June 14, 1932. Serial No. 617,207.

This invention relates to a signaling apparatus, particularly to a manually operated mechanical signaling device designed primarily for use in connection with automotive vehicles, but it is to be understood that a signaling apparatus in accordance with this invention may be employed in any connection for which it may be found applicable, and the invention has for its object to provide, in a manner as hereinafter set forth, a signaling apparatus which is readily attached to a vehicle and including a signal arm capable of being expeditiously adjusted for indicating the direction of travel or turn of the vehicle to drivers of approaching vehicles.

Further objects of the invention are to provide, in a manner as hereinafter set forth, a signaling apparatus for the purpose referred to, which is simple in its construction and arrangement, strong, durable, compact, readily installed, conveniently operated, readily assembled, and comparatively inexpensive to manufacture.

To the above ends essentially, and to others which may hereinafter appear, the invention consists of such parts and such combination of parts which fall within the scope of the invention as claimed.

In the drawing:

Figure 1 is a fragmentary view in front elevation of an automotive vehicle showing the adaptation therewith of the signaling apparatus.

Figure 2 is a fragmentary view in vertical section of a vehicle body showing the application thereto of the signaling apparatus.

Figure 3 is a rear elevation of the apparatus as applied to the vehicle.

Figure 4 is a section on line 4—4 Figure 3.

Figure 5 is a section on line 5—5 Figure 1.

Figure 6 is a section on line 6—6 Figure 1.

Figure 7 is a fragmentary view in elevation of the signal arm.

Figure 8 is a perspective view of the shaft for the signal arm.

Referring to the drawing, 1 denotes the top and 2 one side of the front 3 of an automotive vehicle body of the closed type. The windshield is designated 4. The foregoing structure is illustrated by way of example for the purpose of showing the adaptation of the signaling apparatus with an automotive vehicle.

The apparatus includes a bearing 5 for the supporting shaft 6 of a signal arm 7. The bearing 5 includes a base 8 provided with spaced openings for the passage of holdfast devices 9 to anchor bearing 5 against and to extend forwardly from the front of side 2. Formed integral with and on one side of base 8 is a tapered extension 9 having a lengthwise extending bore 10 of uniform diameter. The base 8 has an opening 11 of greater diameter than and which communicates with the inner end of bore 10. The diameter of opening 11 with respect to bore 10 provides the bearing 5 with an internal annular shoulder 12. The bearing 5 can be anchored at any desired point to side 2.

The shaft 6 includes a circular part 13 which is arranged in bore 10, a head 14 arranged in opening 11 and of greater diameter than part 13, a reduced part 15 extended from the outer end of part 13 and formed with a lengthwise extending flat, smooth peripheral portion 16 and a lengthwise extending curved threaded portion 17.

The arm 7 comprises a body part 18 having a rounded outer end 19 and a squared inner end 20. The corners 21, 22 at the inner end of body part 18 are rounded. Openings 23, 24 are formed in body part 18 in proximity to corners 21, 22 respectively. The inner end of body part 18 is extended laterally as at 25 and opening 24 is arranged in portion 25. The outer side edge of body part 18 in proximity to opening 24 is cutout as at 26. The body part 18 is formed with an inwardly directed continuous flange 27 at the bottom and side edges thereof. The flange 27 extends from a point in proximity to opening 23 to a point in close proximity to cutout 26. The body part 18 at the longitudinal median thereof and at a point adjacent its outer end 19 is formed with an opening 28. The body part 18 has its inner end portion, at the longitudinal median of the latter outset, as at 29 for stiffening such portions. The outset 29 extends from the inner end and is of materially less length than that of body part 18. Secured against the inner face and of less length than body part 18 is a reinforcing plate 30 having a part thereof arranged betwen the side portions of flange 27 and its remaining part flush with the edges of that portion of body part 18 extended from the ends of flange 27. The plate 30 has openings 31, 32 registering with and of the same contour as openings 23, 24 respectively. The openings 23, 31 conform in contour to the cross sectional shape of the reduced part of shaft 6. Preferably plate 30 is spot welded to body part 18 and the latter gradually increases in width from the cutout 26 to the rounded outer end 19.

Positioned against the front and rear faces of body part 18 is an annular attention directing element 33. Each element 33 is of arcuate contour in transverse and horizontal section. Each element 33 has an axial opening 34 and an inwardly extending flared annular flange 35 registering with opening 34. The elements 33 are oppositely disposed. Carried by and extending through the opening and flange of one element 33 and extending into opening 28 is a socket forming member 36. The socket 37 provided by member 36 opens inwardly and has its wall threaded. Carried by and extending through the opening and flange of the other element 33 is a threaded coupling member 38 which engages with the wall of socket 37 for securing elements 33 against body part 18.

The front and rear faces of the arm 7 are colored alike. The elements 33 are colored alike, but the color thereof is different from that of the color of the arm 7 whereby the elements 33 will be distinctly set forth. See Figure 7.

The reduced part 15 of shaft 6 is extended through the registering openings 23, 31 and the inner corner portion at the inner end of arm 7 opposes the outer end edge of bearing 5. The shaft 6 is revolubly mounted in the latter, and owing to the shape of part 15 and openings 23, 31 the shaft 6 will be bodily carried with arm 7 when the latter is adjusted.

Positioned against arm 7 and surrounding reduced part 15 of shaft 6 is a washer 39. Threadedly engaging with the reduced part 15 and bearing against washer 39 is a clamping nut 40 for connecting shaft 6 and arm 7 together. The nut 40 coacts with the head 14 of shaft 6 for connecting the latter to bearing 5.

An operating mechanism is provided for shifting or adjusting arm 6 to the desired position. Said mechanism includes a shaft 41 having a part 42 journaled in the top 1 of the front 3 of the car body. The part 42 is of a length to extend forwardly and rearwardly from top 1 and terminates at its rear into a crank portion 43, provided with an angularly disposed extension 43′, carrying a handle piece 44 within convenient reach of the driver of the car or vehicle. Fixed upon the forward end of part 41 is one end of a crank 45. The outer end of crank 45 is formed with an opening 46. Arranged between crank 45 and arm 7 is a connecting bar 47 having oppositely extending angularly disposed end terminal portions 48, 49, the former extending through opening 46 and the latter through openings 24, 32. Each end terminal portion has a reduced part and an upset part 50, 51 respectively. The reduced part carries a washer 52 and provides a shoulder 53. The reduced parts extend through openings 46, 24 and 32. The shoulders and upset parts couple the connecting rod to crank 45 and arm 7. The construction of each end terminal portion is as illustrated in Figure 5 with respect to portion 49.

The apparatus includes a latching device for maintaining arm 7 in the position desired. The said device includes a semi-circular plate 54 having openings 55 for the passage of holdfast devices 56 for fixedly securing it to and diagonally of the inner face of top 1 of front 3. The plate 54 has a centrally arranged offset annular enlargement 57 providing a socket 58 and an opening 59. The plate 54 is flanged on its rear face as at 60. The flange conforms in contour to and is flush with the curved edge of plate 54. The flange 60 is cutout as at 61, 62, 63 and 64 to selectively receive a resilient latching member 65 having a bow-shaped part 66 anchored at one end in part 42 of shaft 41 and having its other end terminating in an angularly disposed extension 67 which projects through a slot 68 formed in the crank portion 42 of shaft 41. The bow-shaped part 66 opposes the crank portion 42 of shaft 41 and is selectively positioned in any of the cutouts for latching arm 7 in the position desired. The plate 54 is provided on its rear face with the letters S, L and R which associate with the cutouts 62, 63 and 64, to indicate to the operator that by placing member 65 in cutout 62 arm 7 will signal that the vehicle will travel slowly, in cutout 63, arm 7 will signal a left direction of turn and in cutout 64, arm 7 will signal a right direction of turn.

The part 42 of shaft 41 will pass through socket 58 and opening 59. To prevent the lengthwise shifting of part 42 of shaft 41, relative to top 1 of front 3, the part 42 carries a stop pin 69 which is arranged in socket 58. The opening in top 1 through which extends part 42 of shaft 41 is designated 70.

What I claim is:—

1. In a direction signaling apparatus for motor vehicles, an adjustable signal arm, a revoluble supporting shaft therefor, said shaft having a reduced part, said arm being carried by said part, said arm and reduced part having coacting means to provide for bodily moving in unison, a bearing for the portion of said shaft other than said reduced part and adapted to be secured to the vehicle, said bearing and shaft having coacting means to arrest the outward shift of the shaft relative to the bearing, and means engaging with said reduced part for securing said arm upon the latter, said means bodily moving with the shaft.

2. In a direction signaling apparatus for and adapted to be secured to a motor vehicle, the combination of an adjustable signal arm provided near one end with an opening, attention directing elements arranged one against the front and one against the rear of said arm, a socket forming member carried by one of said elements and extending into said opening, and a coupling member carried by the other of said elements and engaging within said socket forming member for securing said elements to said arm.

3. In a direction signaling apparatus for and adapted to be secured to a motor vehicle, the combination of an adjustable signal arm provided near one end with an opening, attention directing elements arranged one against the front and one against the rear of said arm, a socket forming member carried by one of said elements and extending into said opening, and a coupling member carried by the other of said elements and engaging within said socket forming member for securing said elements to said arm, said arm having its front and rear of a like color throughout, each of said elements being of the same color and of a color different from that of the arm.

4. In a direction signaling apparatus for and adapted to be secured to a motor vehicle, an adjustable signal arm comprising a body part having an inwardly directed continuous flange extending throughout its outer end edge and each of its side edges from said outer end edge to a point removed from its inner end edge, a reinforcing plate secured to the rear face of said body part, said plate having a portion of its length arranged between side parts of said flange and the remaining portion of its length flush with the edges of the body part extended from the ends of said flange, said arm formed with an opening in proximity to each corner at the inner end thereof for connecting therewith a revoluble supporting shaft, and a shifting means therefor, said openings extending through said body part and plate.

5. In a direction signaling apparatus for and adapted to be secured to a motor vehicle, an adjustable signal arm comprising a body part having an inwardly directed continuous flange extending throughout its outer end edge and each of its side edges from said outer end edge to a point removed from its inner end edge, a reinforcing plate secured to the rear face of said body part, said plate having a portion of its length arranged between side parts of said flange and the remaining portion of its length flush with the edges of the body part extended from the ends of said flange, said arm formed with an opening in proximity to each corner at the inner end thereof for connecting therewith a revoluble supporting shaft and an operating means therefor, said openings extending through said body part and plate, and said body part having its inner portion formed with a lengthwise extending outset reinforcing portion.

In testimony whereof, I affix my signature hereto,

LAWRENCE L. WAGNER.